United States Patent [19]
Rohloff

[11] Patent Number: 5,140,806
[45] Date of Patent: Aug. 25, 1992

[54] ROLLER CHAIN

[76] Inventor: Bernhard Rohloff, Grillparzer Str. 29, Kassel, Fed. Rep. of Germany

[21] Appl. No.: 536,656
[22] PCT Filed: Oct. 27, 1989
[86] PCT No.: PCT/DE89/00693
  § 371 Date: Jun. 18, 1990
  § 102(e) Date: Jun. 18, 1990
[87] PCT Pub. No.: WO90/04728
  PCT Pub. Date: May 3, 1990

[30] Foreign Application Priority Data
Oct. 28, 1988 [DE] Fed. Rep. of Germany ....... 3836738
Dec. 15, 1988 [DE] Fed. Rep. of Germany ....... 3842140

[51] Int. Cl.$^5$ ............................................. F16G 13/06
[52] U.S. Cl. .............................................. 59/78; 59/4; 59/5; 474/228; 474/231
[58] Field of Search .......... 474/206, 226, 228, 231; 59/4, 5, 8, 78

[56] References Cited

U.S. PATENT DOCUMENTS

| | | | |
|---|---|---|---|
| 1,945,357 | 1/1934 | Pierce | 474/231 |
| 2,113,980 | 4/1938 | Brill | 474/231 |
| 2,142,003 | 12/1938 | Morgelin | 474/231 |
| 2,568,649 | 9/1951 | McIntosh | 474/231 |
| 4,265,134 | 5/1981 | Dupoy et al. | 474/231 |
| 4,704,099 | 11/1987 | Rohloff | 474/231 |

FOREIGN PATENT DOCUMENTS

| | | |
|---|---|---|
| 233640 | 8/1987 | European Pat. Off. . |
| 2829424 | 2/1979 | Fed. Rep. of Germany . |
| 3434516 | 2/1986 | Fed. Rep. of Germany . |

*Primary Examiner*—David Jones
*Attorney, Agent, or Firm*—Michael J. Striker

[57] ABSTRACT

A roller chain for bicycles comprises a plurality of outer links each having a pair of outer plates each having two pin holes, two pins extending through the pin holes and connecting the outer plates of each of the outer links with one another, a plurality of inner links arranged alternately with the outer links and each having a pair of inner plates each provided with a bearing collar defining an inner hole and carrying a roller. The inner holes have a cross-section which is elongated in a longitudinal direction. At least one of the pin holes in the outer plates and the inner holes in the bearing collars are offset so that a roller pitch of the inner and outer links in a stretched state of the chain is adjusted substantially to the same value.

13 Claims, 6 Drawing Sheets

ROLLER CHAIN

BACKGROUND OF THE INVENTION

The invention is directed to a roller chain particularly for bicycles with derailleur. The chain comprises alternately arranged inner and outer links which are connected with one another in an articulated manner, wherein the outer links comprise a pair of outer plates which are connected with one another by means of two pins, and the inner links comprise an inner plate pair which is arranged between the outer plates and supported on the pins so as to be rotatable. Two tubular elements (bearing collars) are arranged at the inner plates, which tubular elements carry a roller and comprise the pins in each instance.

A variety of such chains are known. Thus, e.g. D. J. Mackintosh in U.S. Pat. No. 2,568,649 shows a roller chain with a bearing collar drawn out of the inner plate. Sedis DE 28 29 424 likewise shows different versions with the bearing collars drawn out of the inner plate. These collars are cylindrical with respect to their outer and inner diameters and are applied to the center of the pin. In order to obtain a good pressing of the link between the pin and collar, exacting tolerances are prescribed which correspond to a running clearance between the pin and collar of a maximum of approximately 0.05-0.1 in commercially available high-performance chains. Accordingly, the pins can swivel by, at most, approximately one degree into the bearing collar in completely assembled brand-new chains, so that the chain has very little flexibility in the lateral direction.

An increase in the movability of the pin would be possible only by means of a greater running clearance; but this would have disadvantageous results for the pressing of the links due to the difference between the radii of the pins and bearing collars. Moreover, an increase in the running clearance allows a greater rotation of the links around the longitudinal axis of the chain, which becomes noticeable in a very negative manner during the shifting process.

Further, in the known roller chains, the running clearance between the pin and bearing collar and between the bearing collar and roller which is required for technical reasons relating to manufacture and operation results in increased elastic deformations of the articulated structural component parts at high load transmission due to the high pressing of the links. It makes itself felt chiefly in an elastic lengthening of the chain in the order of magnitude of three to five hundredths of a millimeter per chain link in that area of the meshing of the teeth in which the load is transmitted to the chain gear wheels, wherein this lengthening acts chiefly between adjacent inner links.

In addition to the elastic lengthening of the plates themselves, this is a substantial reason why the chain links slide up on the tooth flanks of the loaded teeth of the chain wheels and is accordingly a substantial cause of wear of the tooth flanks. Since the link wear in conventional chains also makes itself felt in a lengthening of the chain between adjacent inner links, these negative factors accumulate.

SUMMARY OF THE INVENTION

Therefore, the object of the present invention is to provide remedies for the aforementioned disadvantages. In particular, the invention proposes a roller chain which is sufficiently flexible in the lateral direction, has a substantially constant pitch and is less sensitive to wear and elastic elongation. In keeping with these objects and with others which will become apparent hereinafter, one feature of the present invention resides, briefly stated, in a roller chain for bicycles with alternatingly arranged inner and outer links connected with one another in an articulated manner with the outer links comprising a pair of outer blades connected by two pins and the inner links comprising an inner plate pair arranged within the outer blades and rotatably supported on the pins, wherein two inner holes comprising bearing collars with pins carrying a roll are arranged at the inner plates, in which in accordance with the present invention the inner holes have an oval or elongated cross-section in the longitudinal direction of the chain, and the roller pitch of the inner and outer links in the stretched state of the chain is adjusted substantially to the same value by means of a corresponding offsetting of the pin holes in the outer plates and/or the inner holes in the bearing collars.

The invention makes use of the surprising realization that the oval or elongated inner holes in the claimed chain construction have no substantial influence on the chain pitch. The lateral flexibility can accordingly be substantially increased in comparison to known chains.

In a surprisingly simple manner, the oval or elongated inner holes also enable a design of the bearing collar such is accordingly comparatively low, on the whole. In accordance with another feature of the present invention, the outer plates can be provided with stop projections for the inner plates above and below the pin holes.

Still another feature of the present invention is that the outer surfaces of the bearing collars carrying the rollers are formed from four cylinder surface segments, which extend along 90° in such a way that their section planes perpendicular to the center axes of the bearing collars have an outer contour in the shape of a square with convex side lines, and the bearing rollers are arranged at the inner plate in such a way that two cylinder surface segments lie on one side and the two other cylinder surface segments lie on the other side of a center plane including the center axes of the bearing collars.

In accordance with a further feature of the present invention, the outer surfaces of the bearing collars carrying the rollers are formed from three cylinder surface segments which extend over 120° in such a way that their section planes perpendicular to the center axes of the bearing collars have an outer contour in the shape of an equilateral triangle with convex side lines, and the bearing collars are arranged in the inner plate in such a way that one of the cylinder surface segments is directed toward the center of the inner plate and is bisected by a center plane containing the center axes of the bearing collars, while the contact surface of the other two outer surface segments contain these axes.

Finally, the inner surfaces of the bearing collars receiving the pins can be formed from three inner surface segments which extend along 120° and planar or convex surface segments connecting the lateral tangentially in such a way that their section planes perpendicular to the center axes of the bearing collars have an outer contour of three circular arc segments which are spread apart radially by the center axes and extend along 120°. The circular arc segments are connected with their outer corner points by straight or convex lines, and the inner surface segments and surface portion are arranged at the inner surface segments and surface portions are arranged at the inner plates in such a way that one of the cylinder surface segments is directed toward the adjacent outer link and is bisected by a center plane which contains the center axes of the bearing collars and simultaneously bisects the surface portion connecting the other two cylinder surface segments. In addition, the pins of the roller chain, according to the invention, are comprised in a positive-locking manner e.g. in the load direction preferably at approximately 120 degrees by the bearing collars, so that lower values result for the link pressing and, consequently, a lower wear of the link and a smaller elastic deformation of the pins and bearing collars. However, the pin can move freely and deflect laterally toward the center of the plate. Accordingly, a high lateral chain flexibility is obtained which is independent of the running clearance of the pins and bearing collars. On the other hand, the angle of rotation around the longitudinal axis of the chain links relative to one another is limited by the height of the elongated holes independent of the longitudinal clearance of the pin in the bearing collar.

The oval or elongated inner holes can be arranged in the bearing collar in two ways. For technical reasons relating to manufacture, a symmetrical arrangement is recommended in which the centers of the outer and inner contours of the bearing collars coincide. When the chain is stretched, the centers of the pins are therefore clearly displaced in an outward direction from the centers of the bearing collars. However, in order to maintain a uniform roller pitch, i.e. a constant distance between the centers of the rollers when the chain is stretched, the pitch of the outer plates, that is, the distance between the pin centers in the outer plates, is correspondingly decreased.

However, the inner holes of the bearing collars can also be designed in such a way that they are arranged asymmetrically in the bearing collars, i.e. offset toward the middle of the plate, and the pins are held exactly in the centers of the bearing collars. In this case, an adjustment of the pitch is not necessary, since it is already fixed by the shape of the bearing collars.

Additional advantageous features of the invention follow from the subclaims.

The roller chain, according to the invention, is explained in more detail in the following with the aid of embodiment examples in connection with the drawing.

DESCRIPTION OF PREFERRED EMBODIMENTS

Figure 1:
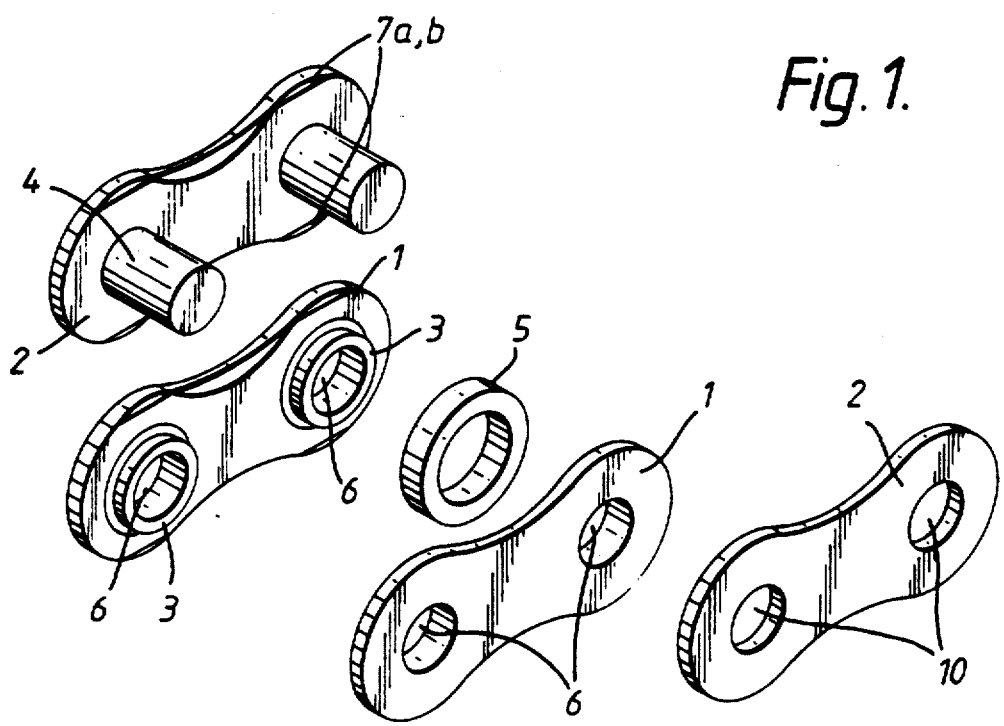
FIG. 1 shows an exploded drawing of a link of the roller chain according to the invention.

According to FIGS. 1 to 4, the roller chain contains, in a conventional manner, a plurality of inner and outer links which are arranged one after the other in an alternating manner in the direction of the longitudinal axis A of the roller chain. Every inner link comprises at least two plate-shaped inner plates 1 which are aligned with one another, arranged symmetrically on both sides of the axis A and provided with tubular bearing collars 3 on their facing sides, which bearing collars 3 are aligned with one another, at a distance from one another in the longitudinal direction and form continuous inner holes 6 in the inner plates 1. Every outer link comprises at least two plate-shaped outer plates 2 which are arranged symmetrically on both sides of the axis A and comprise pin holes 10 for receiving a pin 4, which pin holes 10 are aligned with one another and at a distance from one another in the longitudinal direction. In the assembled state of the roller chain, as shown in particular in FIG. 4, one end of an inner link lies between the assigned ends of the two outer plates 2 of an adjacent outer link. The connection of the outer and inner links is effected in each instance by means of a pin 4 which projects through the inner holes 6 of the opposite bearing collar 3 and the pin holes 10 of the adjacent outer link and is e.g. riveted with the outer plates 2. Finally, rollers 5, which are supported so as to be loosely rotatable and hold the inner plates 1 at a distance which is smaller than the distance between two outer plates 2, are arranged on the bearing collars 3.

Roller chains of this type are generally known (e.g. U.S. Pat. No. 4,704,009) and therefore need not be discussed in more detail.

The inner holes 6 of the bearing collars 3 comprise, according to the invention, an oval or elongated cross section in the longitudinal direction of the chain. The diameter of the inner holes 6 measured in the longitudinal direction of the chain is greater than the diameter of the cylindrical pins to the extent that the latter can swivel in an unimpeded manner around the outer bearing edges $3k$ of the bearing collars 3 located at the ends of the inner holes 6 by an amount which is greater than that enabled by the conventional tolerances, preferably at least two degrees, in a completely assembled brand-new roller chain (FIG. 2).

On the other hand, the diameter of the inner holes 6, as measured perpendicular to the pulling or longitudinal direction of the chain, is greater than the pin diameter only by the conventional tolerances or a little more. With a conventional pin diameter of approximately 3.6 mm, the large diameter of the inner holes 6 is e.g. 3.9 to 4 mm, the small diameter, on the other hand, is e.g. 3.7 mm when the distance of the opposite bearing edges $3k$ of the two respective inner plates 1 is approximately 4.2 mm. At the top, the length of the large diameter is defined by the wall thickness of the bearing collars, which should be at least approximately 0.6 mm, while the small diameter should not be constructed substantially greater than described above, since the chain is otherwise unstable relative to rotations around its longitudinal axis A. With other pin diameters, these measurements are to be adapted in a corresponding manner. Further, tests have shown that substantially greater lateral swiveling movements of the chain links are not necessary and bring about no additional advantages, while smaller swiveling movements result in increasingly poor results. The value of two degrees is therefore considered best at the current time.

Figure 2:
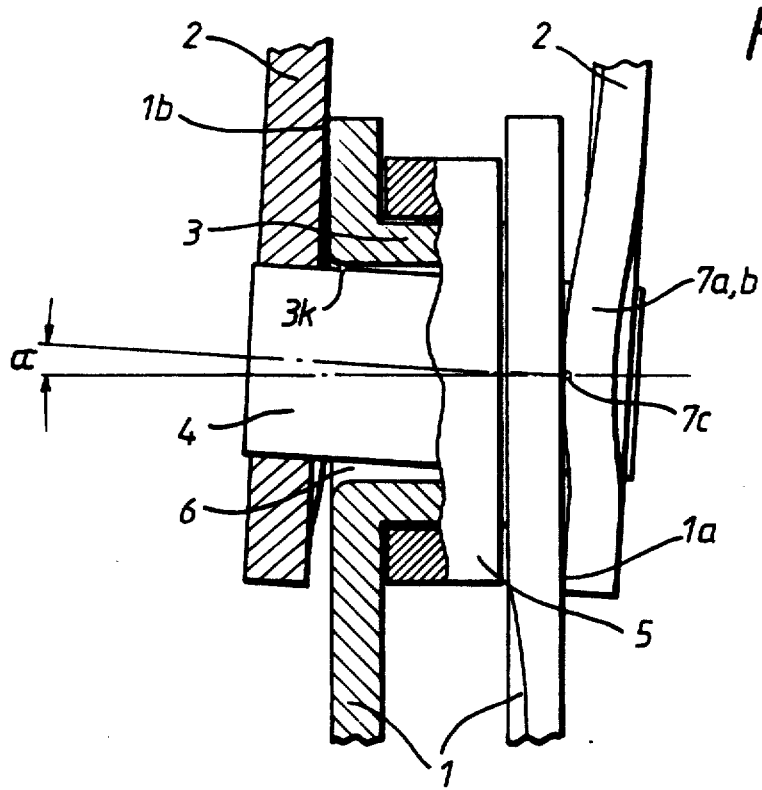
FIG. 2 shows a top view of a laterally deflected chain link in half-section along line II—II of FIG. 3.

FIG. 2 shows a link in the laterally deflected state. It is to be noted that the pin 4 can deflect laterally in the inner hole 6 by an angle A along the outer bearing edges 3k. A still greater swiveling of the inner links 1 relative to the outer links 2 is limited with respect to construction in that the inner plates 1 abut at the outer plates when reaching a desired maximum angle, as is shown at 1a and 1b. Moreover, the outer plates 2 are preferably provided at their edges 7a and 7b located above and below the axis A and above and below the pin holes 10—as seen in the longitudinal direction of the chain—with punctiform stop projections 7c projecting in the direction of the center plane of the chain, as shown particularly by FIGS. 1, 2 and 5. On one hand, these stop projections 7c allow the desired lateral swiveling of the chain links corresponding to FIG. 2; but at the same time they hold the inner plates 1 in their position which is symmetrical to the center plane of the chain, so that the inner links cannot be displaced laterally in their entirety, i.e. parallel to the pin axes. The stop projections 7c can be obtained by means of a corresponding shaping of the edges 7a, 7b in that the outer plates 2 are provided either with correspondingly angled edges 7a (FIG. 5, left) or are curved around the longitudinal axis of the chain (edges 7b in FIG. 5, right).

Figure 3:
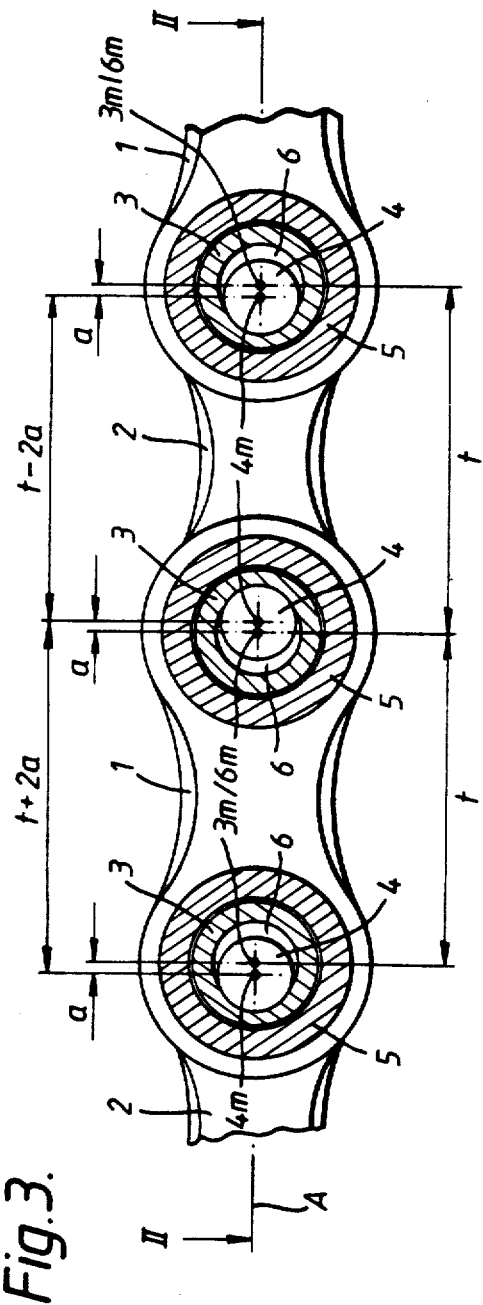
FIG. 3 shows a plurality of links of the roller chain, according to the invention, in vertical section.
Figure 4:
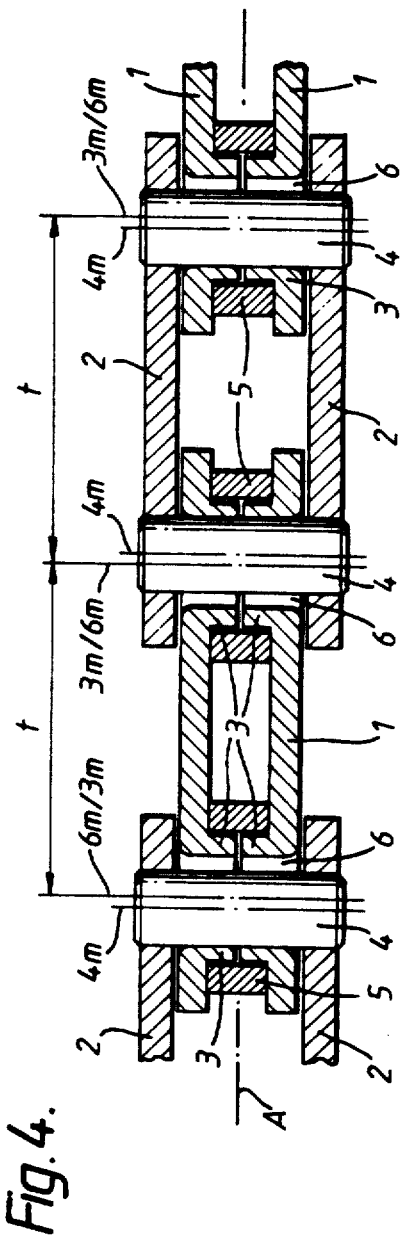
FIG. 4 shows the link of FIG. 3 in a section along line IV-IV of FIG. 3.
Figure 6:
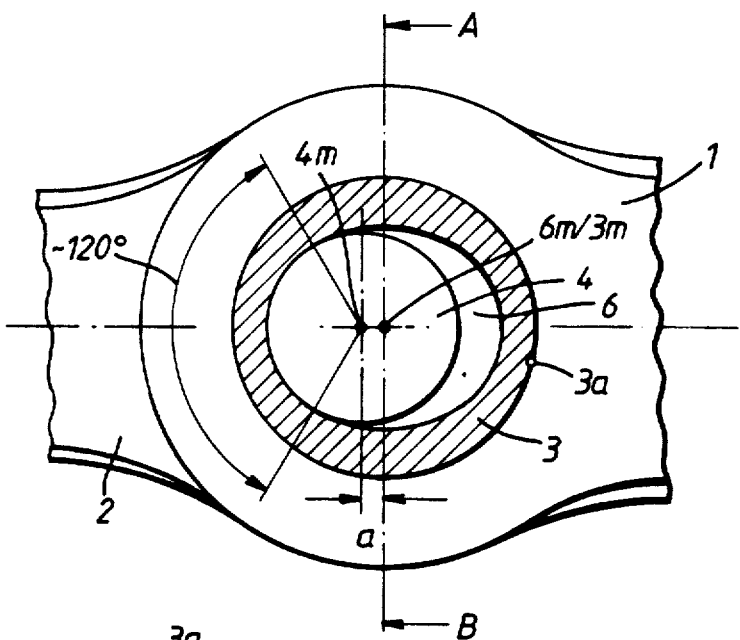
FIG. 6 shows an individual chain link in vertical section with symmetrical arrangement of an inner hole in a bearing collar.

FIGS. 3 and 4 show a plurality of chain links in the stretched state. The center axes 4m of the pins 4 are clearly displaced from the center axes of the rollers 5 and bearing collars 3 by an amount a, specifically in the direction of the adjacent outer plates 2. In a symmetrical, central arrangement of the inner holes 6 in the bearing collars 3, this displacement results in that the center axes 6m of the inner holes 6 and the center axes 3m of the outer contours of the bearing collars 3 coincide, wherein the wall thickness of the bearing collars 3 at the areas adjoining the inner holes 6 in the longitudinal direction of the chain are substantially identical (FIG. 6).

The pitch t of the rollers 5 which is important for operation, i.e. the distance between their center axes when the chain is stretched, is kept constant in that the distance between the axes of the pins 4 and the pin holes 10 of the outer plates 2 which receive them is reduced corresponding to a amount 2a; on the other hand, the value t is maintained for the distance between the center axes 3m of the outer contours of the bearing collars 3 and the center axes 6m of the inner holes 6. The amount 2a corresponds to twice the amount a by which every pin axis 4m is displaced out of the center axis 6m of the inner holes 6 and the center axes 3m of the outer contours of the bearing collars 3 when the chain is stretched.

Therefore, according to FIGS. 3 and 4, the distance between the pin axes 4m in the outer links is determined with respect to construction at $t-2a$. On the other hand, the distance between the pin axes 4m amounts to $t+2a$ when the chain is stretched, as measured in the inner links. The distance between the center axes 6m of all rollers 5, on the other hand, amounts to t in each instance, so that a constant pitch t results for the rollers 6 by means of adjusting the pin spacing in the outer plates 2 to the value $t-2a$.

Figure 7:
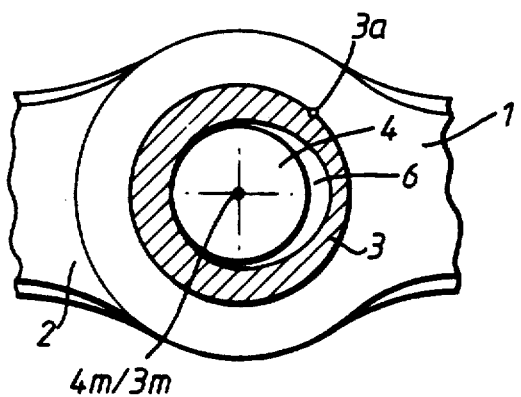
FIG. 7 shows an individual chain link in vertical section with asymmetrical arrangement of an inner hole in the bearing collar.

Such a correction for keeping the roller pitch constant is not required if, in accordance with another embodiment form of the invention (FIG. 7), the inner holes 6 are displaced by the amount a toward the center of the inner plates 1 and are accordingly arranged asymmetrically in the bearing collars 3, so that the center axes 4m of the pins 4 and the center axes 3m of the outer contours of the bearing collars 3 coincide when the chain is stretched. The roller pitch then corresponds again everywhere to the amount t.

FIG. 6 shows the oval or elongated cross section of the inner hole located in the bearing collar 3. The inner hole 6 is preferably designed in such a way that it comprises the pins 4 in the load direction in a positive-locking manner by approximately 110 degrees to 140 degrees in order, accordingly, to obtain low surface-area pressing. A value of 120 degrees has been proven to be the best value so far, since it is a good compromise between a small surface-area pressing and the desired small, but still noticeable, rotation of the pins 4 around the longitudinal axis A of the chain.

Figure 8:
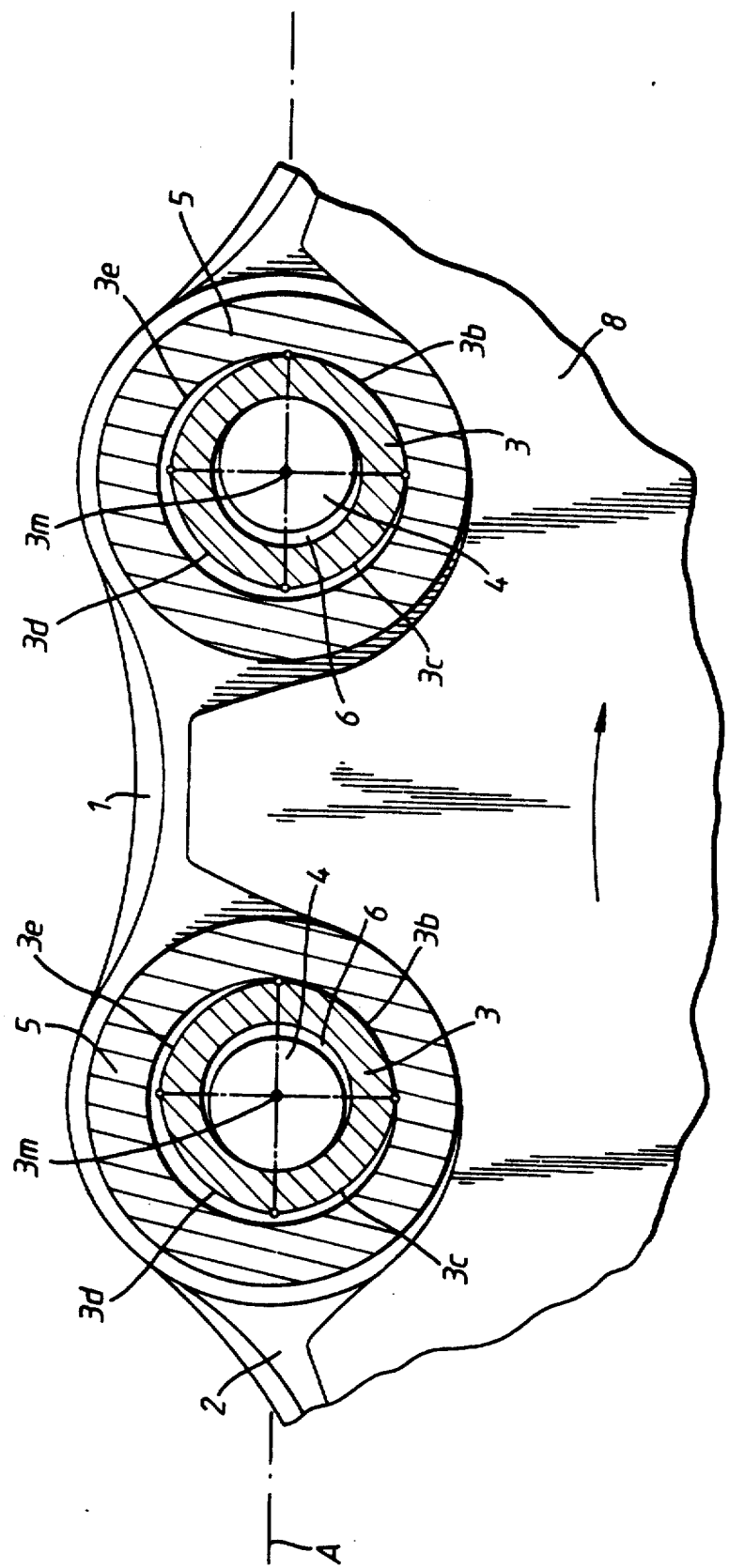
FIG. 8 shows a vertical section through an inner link of a second embodiment form of the roller chain, according to the invention, in mesh with a chain gear wheel.

FIG. 8 shows an embodiment form in which, in contrast to FIGS. 1 to 6, the outer bearing surface carrying a roller 5 in each instance is formed from four cylinder surface segments 3b, 3c, 3d and 3e of identical dimensioning which extend along 90 degrees in each instance and which, in cross section perpendicular to the center axes 3m, result in a surface whose outer contour corresponds to that of a square whose sides are not straight, but rather outwardly convex, whose center lies on the center axis 3m, and whose enveloping circle contacting the four corners has a radius which is somewhat smaller, preferably approximately 0.1 mm smaller, than the radius of the convex lateral side lines. The center axes of the cylinder surface segments 3b to 3e therefore intersect a circle with a radius of approximately 0.1 mm. The radius of the convex side lines is preferably exactly equal to the radius of the inner holes of the rollers 5 so that every cylinder surface segment can contact the inner contour of the rollers 5 in a positive-locking manner, so that a low surface-area pressing is achieved. Additional details follow from FIG. 8 which is accordingly expressly referred to.

The bearing collars 3 are preferably arranged at the inner plates 1 in such a way that for each bearing collar 3 there are always two cylinder surface segments 3b, 3c located on one side and the two other cylinder surface segments 3d, 3e on the other side, respectively, of the axis A and the central plane containing the axis A and the center axes 3m, and the latter therefore extends exactly through the contact surfaces of the cylinder surface segments 3b, 3e and 3c, 3d, respectively.

FIG. 8 shows the chain meshing with a chain wheel 8 driven by the chain. It is to be noted that, due to the special shaping of the bearing collars 3, the rollers 5 are supported along a fourth of the bearing collar circumference in a positive-locking manner by the cylinder surface segments 3b which are directed in the running direction of the chain (arrow), that is, toward the front and toward the chain wheel 8. This results, in connection with the positive-locking support of the pins 4 at the inner bearing surfaces of the bearing collars 3 lying at the front or rear in the running direction of the chain, in a substantial reduction of the elastic deformation of the articulated structural component parts, which results in a reduction in wear of the tooth flanks of the chain wheel 8.

When the chain meshes with a driving chain wheel, e.g. driven by means of the pedals, likewise in the direction of the arrow, the rear cylinder surface segment 3c directed toward the chain wheel 8 is supported against the latter in a positive-locking manner. Accordingly, in connection with the positive-locking contact of the pins 4 in the inner holes 6, low values result in both instances for the pressing of the links, also during high load transmission, and consequently, in contrast to conventional chains with cylindrical bearing collars, lower elastic elongations of the chain.

Figure 9:
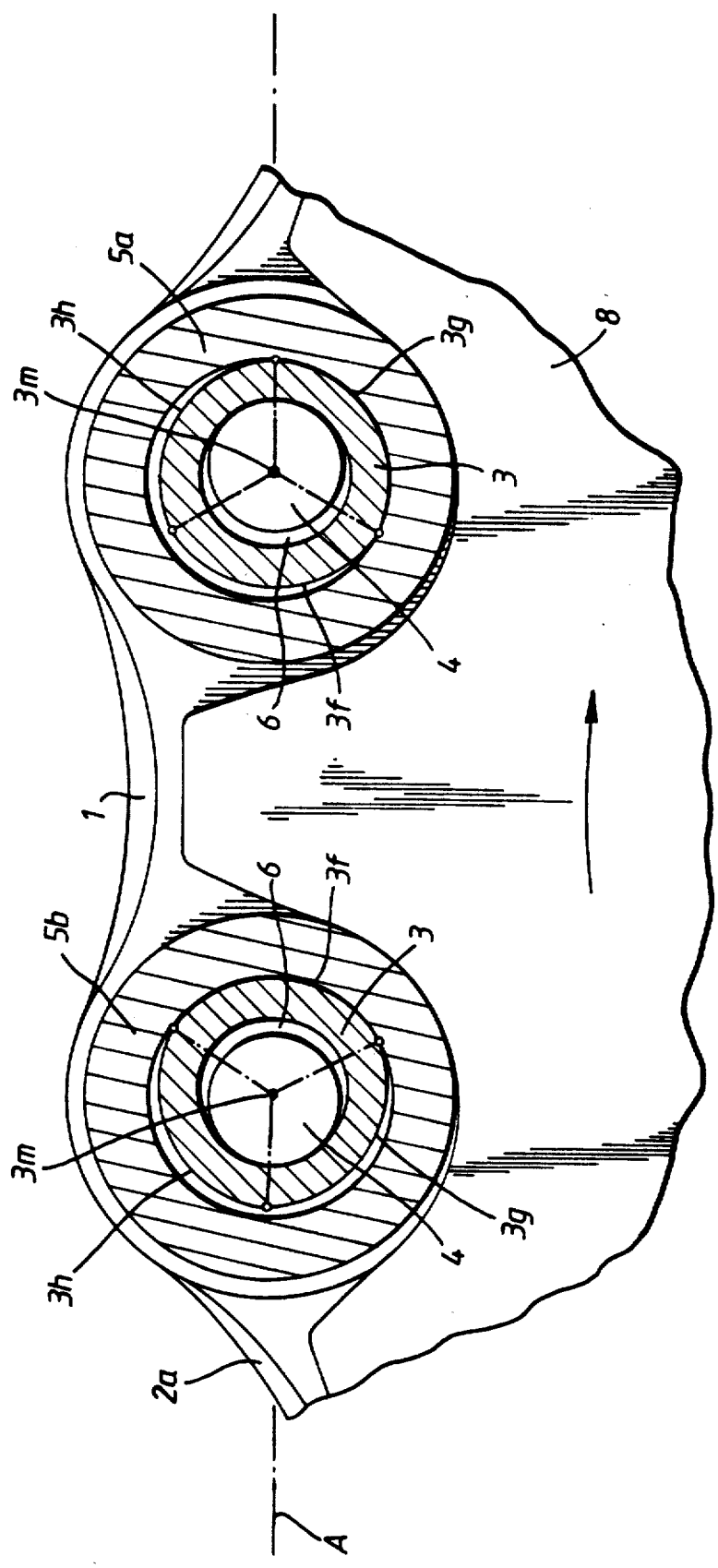
FIG. 9 shows a vertical section through an inner link of a third embodiment form of the roller chain, according to the invention, in mesh with a chain wheel.
Figure 10:
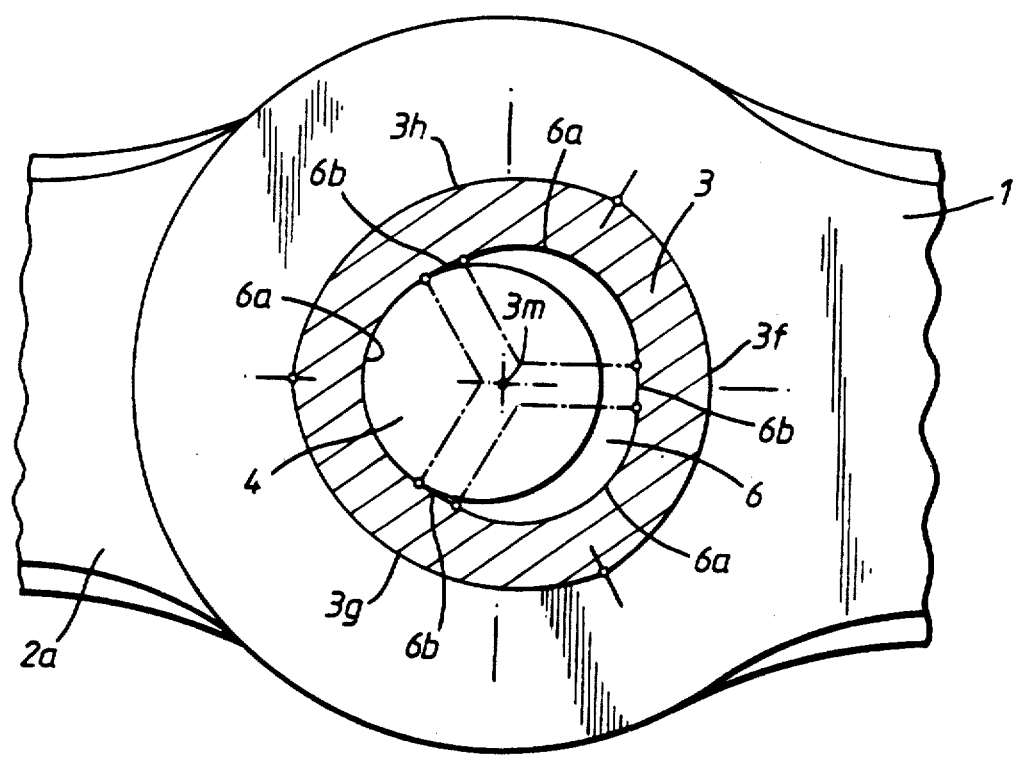
FIG. 10 shows the position of the bearing collar relative to the inner plate in the embodiment form according to FIG. 9.

Finally, FIGS. 9 and 10 show the embodiment form which is considered the best at the current time, in which, in contrast to FIG. 8, the outer bearing surfaces of the bearing collars 3 are composed of three cylinder surface segments 3f, 3g and 3h which are of identical dimensioning and extend along 120 degrees in each instance. In cross section perpendicular to the center axes 3m, the cylinder surface segments 3f to 3h result in a surface whose outer contour approximately corresponds to that of an equilateral triangle whose sides are not straight, but rather curved outward, and whose enveloping circle contacting the three corners has a radius which is somewhat smaller, preferably approximately 0.1 smaller, than the radius of the convex sides. The axes of the three cylinder surface segments 3f to 3h therefore intersect a circle with a radius of approximately 0.1 mm. In this case also, the radius of the convex side lines is preferably exactly equal to the radius of the inner holes of the rollers 5 so that every cylinder surface segment can contact the inner contour of the rollers 5 in a positive-locking manner, so that a small surface-area pressing is achieved. Further details follow from FIGS. 9 and 10 which are hereby expressly referred to.

The bearing collars are preferably arranged at the inner plates 1 in such a way that a cylinder surface segment 3f directed toward the center of the inner plates 1 is exactly bisected by the axis A and the corresponding center plane, while the two other cylinder surface segments 3g and 3h lie on one side of the axis A and the axis A extends through their tangent plane.

The pitch of the outer links is preferably t−2a, as in the embodiment examples according to FIGS. 1 to 6 and 8.

FIG. 9 again shows the chain meshing with the chain wheel 8 driven by the chain in the direction of the arrow. It is to be noted that the forward roller 5a of the inner link 1 is supported in a positive-locking manner along a third of the bearing collar circumference by that cylinder surface segment 3g which is directed toward the front in the running direction of the chain and toward the chain wheel 8, while the following roller 5b is supported in a positive-locking manner by the cylinder surface segment 3f directed toward the center of the inner plate 1 and lying symmetrically relative to the axis A, likewise along a third of the bearing collar circumference. When meshing with a chain wheel rotating in the direction of the arrow, but driving the chain, the forward roller 5a would be supported by the cylinder surface segment 3f directed toward the center of the inner plate 1 and located symmetrically relative to the axis A, while the following roller 5b would contact the cylinder surface segment 3g directed toward the rear and the bottom.

For technical reasons relating to manufacture, it is recommended in the embodiment form according to FIGS. 9 and 10 also to give the inner contours of the inner holes 6 a particular shape. The inner holes 6 are likewise formed from three cylindrical segments 6a (FIG. 10) of identical dimensions which extend along somewhat less than 120 degrees in each instance and are connected in each instance by short planar or slightly convex outwardly curved surface portions 6b. In a cross section perpendicular to the axes 3m, a surface is accordingly obtained which is formed e.g. in that three circular segments of identical dimensions extending along 120 degrees are pushed out radially by a distance of approximately 0.1 mm and the gaps which are accordingly formed between the three circular arc portions extending along 120 degrees are then connected by means of straight or slightly convex outwardly curved lines. The enveloping circle at the corner points of the three circular arc portions is then somewhat greater than the radius of the circular arc portions, wherein the axes of the three cylinder surface segments 6a again lie on a circle with a radius of approximately 0.1 mm. The radius of the circular arc portions is preferably equal to the pin radius so that every cylinder surface segment 6a can contact the pins 4 in a positive-locking manner, so that a small surface-area pressing is achieved. In contrast to the cylinder surface segments 3f, 3g and 3h, the described cross-sectional surface does not lie completely within the enveloping circle, but rather partially outside of it.

Figure 5:
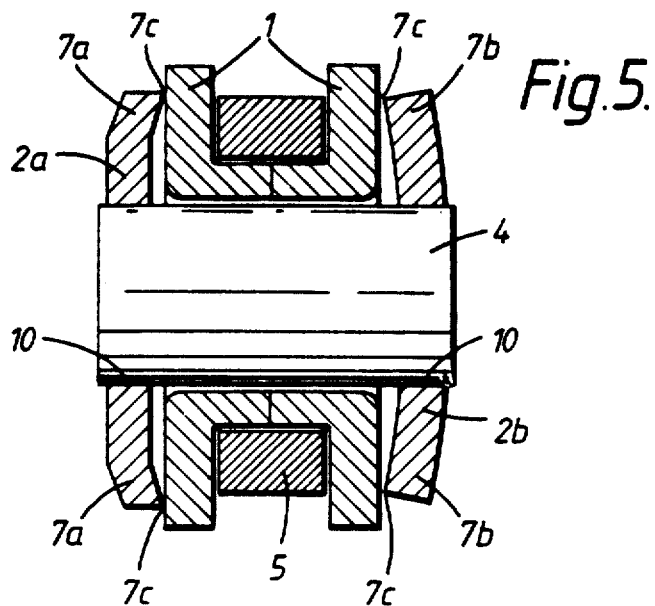
FIG. 5 shows a chain link in section A-B of FIG. 6.

The inner holes 6 are arranged in the bearing collar 3 in such a way that a circular arc portion 6a is always directed exactly toward the adjacent outer link 2a (FIG. 10) and is exactly bisected by the axis A and center plane, so that the pins 4 are held in the running direction of the chain along a third of the pin circumference in a positive-locking manner. On the other hand, on the diametrically opposite side, the axis A extends exactly through the center of that planar portion 6b which connects the two other cylinder surface segments 6a, such as can be seen exactly particularly from FIG. 10. Accordingly, here also, low values result for the link pressing during high load transmission as well as correspondingly low elastic deformations of the articulated structural components. The rotation of the chain links around the longitudinal axis of the chain is defined in this construction only by the curved or angled edges 7a and 7b, respectively, of the outer plates 2 (FIGS. 2 and 5).

Due to the different contact of the rollers 5a and 5b at the variously arranged cylinder surface segments 3g and 3f, a somewhat greater value results here for the roller pitch measured in the inner link during the engagement of the teeth than for the roller pitch measured in the following outer link. However, this difference is so small that it can be absorbed by the geometry of the teeth of the chain wheel and can be determined with respect to construction via the shape of the cylinder surface segments 3f, 3g, 3h. If this difference is suitably designed, the chain obtains an exact uniform pitch only after a determined extent of link wear or at a determined elastic deformation of the articulated structural component parts. A further reduction in the wear of the tooth flanks results from this because of the improved load distribution to the teeth of the chain wheel, particularly with the use of light-metal chain wheels conventionally used in cycling. Moreover, as a result, a brand-new chain possesses the optimal dimensions always only after a certain elongation caused by wear or only in an elastically lengthened state, occurring at high load transmission, up to approximately five hundredths of a millimeter per link, and therefore, only after this, obtains increasingly poor characteristics caused by further wear.

The invention is not limited to the described embodiment examples which can be modified in a simple manner. In particular, it is understood that the individual features assigned to the various embodiment examples can also be applied in other combinations than those described and the chain pitch can also be kept constant partly by means of decreasing the pin pitch in the outer links and partly by means of offsetting the inner holes 6 in the bearing collars 3.

I claim:

1. A roller chain for bicycles, comprising a plurality of outer links each having a pair of outer plates, said outer plates each having two pin holes, each pin hole having a center; an plurality of pins, each having a diameter and a longitudinal center and extending through said pin holes and connecting said outer plates of each of said outer links with one another; a plurality of inner links arranged alternately with said outer links and each having a pair of inner plates each provided with a pair of bearing collars defining inner holes each having a center, said collars receiving one of said pins and carrying a roller, each roller having a center axis, said inner holes being elongated in a longitudinal direction of the chain with respect to the diameters of said pins so that the chain can move between a stretched state and an unstretched state, said centers of said pin holes in said outer plates and centers of said elongated inner holes in said bearing collars, in the stretched state, being offset relative to one another in the longitudinal direction of the chain so that a distance between center axes of said rollers in said stretched state of the chain is substantially equal.

2. A roller chain as defined in claim 1, wherein said inner holes of said inner plates have an oval shape.

3. A roller chain as defined in claim 1, wherein said bearing collars have outer surfaces for carrying said rollers and having center axes, said inner holes having center axes which coincide with said center axes of said outer surfaces of said bearing collars.

4. A roller chain as defined in claim 1, wherein said bearing collars have outer surfaces for carrying said rollers and having center axes, said pins having center axes which coincide in the stretched state of the chain with said center axes of said outer surfaces of said bearing collars.

5. A roller chain as defined in claim 1, wherein said inner hole of said bearing collars are formed so that they embrace said pins along approximately 110–140 degrees.

6. A roller chain as defined in claim 1, wherein said outer plates are provided with stop projections for said inner plates above and below said pin holes.

7. A roller chain as defined in claim 1, wherein said bearing collars have outer surfaces carrying said rollers, said outer surfaces being formed from four contiguous cylindrical surface segments each extending substantially 90° in such a way that cross-sections of said bearing collars in section planes extending perpendicular to said center axes of said bearing collars each have an outer contour roughly in the shape of a square, said bearing collars being arranged on said inner plates in such a way that two of said cylindrical surface segments lie on one side and the two other cylinder surface segments lie on the other side of a bearing collar center plane extending through said center axes of said bearing collars.

8. A roller chain as defined in claim 1, wherein said bearing collars have outer surfaces carrying said rollers, said outer surfaces being formed from three contiguous cylindrical surface segments each extending over substantially 120° in such a way that cross-sections of said bearing collars in section planes extending perpendicular to said center axes of said bearing rollers each have an outer contour roughly in the shape of an equilateral triangle, said bearing collars being arranged on said inner plates in such a way that one of said cylindrical surface segments is directed toward a center of said inner plate and is bisected by a center plane extending through said center axes of said bearing collars, while a contact surface of the other two of said outer surface segments lie within said center plane.

9. A roller chain as defined in claim 1, wherein said bearing collars have inner surfaces receiving said pins, said inner surfaces being formed from three inner surface segments each being spread radially from said center axis and extending along substantially 120° and further surface segments connecting said inner surface segments tangentially in such a way that cross-sections of said bearing collars in section planes extending perpendicular to said center axes of said bearing collars each have an outer contour of three circular arc segments which are spread apart radially by said center axes and each extend along substantially 120°, said circular arc segment being connected at their outer corner points by line, said inner surface segments and said further surface segments being arranged at said inner plates in such a way that one of said inner surface segments is directed toward an adjacent one of said outer links and bisected by a center plane which extends through said center axes of said bearing collars and simultaneously bisects the further surface segment connecting the other two inner surface segments.

10. A roller chain as defined in claim 9, wherein said further surface segments are formed as planar segments.

11. A roller chain as defined in claim 9, wherein said further surface segments are formed as convex surface segments.

12. A roller chain as defined in claim 9, wherein said lines connecting said circular arc segments are formed as rectilinear lines.

13. A roller chain as defined in claim 9, wherein said lines connecting said circular arc segments are formed as convex lines.

* * * * *